United States Patent [19]
Cornelius

[11] 3,897,613
[45] Aug. 5, 1975

[54] TENSION RELEASE CONTROL ELEMENT

[75] Inventor: Kenneth T. Cornelius, Potomac, Md.

[73] Assignee: The United States of America as represented by the Secretary of the Navy, Washington, D.C.

[22] Filed: Mar. 19, 1974

[21] Appl. No.: 452,598

[52] U.S. Cl. .................................................. 24/273
[51] Int. Cl.² ........................................... B65D 63/00
[58] Field of Search ..... 24/273, 16, 20, 270, 68 BT; 220/55 AN

[56] References Cited
UNITED STATES PATENTS

| 1,031,813 | 7/1912 | Nix | 24/273 |
| 1,085,918 | 2/1914 | Jenkins | 24/270 |
| 1,088,530 | 2/1914 | Buse | 24/273 |
| 2,449,798 | 9/1948 | Weber | 24/270 |
| 3,276,089 | 10/1966 | Cheever et al. | 24/270 |

FOREIGN PATENTS OR APPLICATIONS

| 1,286,374 | 1/1962 | France | 220/55 AN |
| 123,596 | 12/1948 | Sweden | 24/68 BT |

*Primary Examiner*—Donald A. Griffin
*Attorney, Agent, or Firm*—R. S. Sciascia; Q. E. Hodges; O. M. Wildensteiner

[57] ABSTRACT

A release element for a band that is wrapped around two parts that are to be releaseably secured together. The element allows a small force to overcome a large tension force in the band and gives reliable, repeatable results under all conditions.

8 Claims, 3 Drawing Figures

TENSION RELEASE CONTROL ELEMENT

The invention described herein may be manufactured and used by or for the Government of the United States of America for governmental purposes without the payment of any royalties thereon or therefor.

BACKGROUND

The present invention is a quick-acting release device for a container vent hatch cover. Such a device is employed with containers which contain materials that can generate dangerous internal pressures, and which must be vented when the pressure reaches a preset level.

The two jaw blocks that are to be releaseably secured together are encircled by several wrappings of a flexible band, one end of which is fixed between the jaws and the other of which is restrained by the release element. In the past, the free end of this band was bent around a chock pin to anchor it and then attached by a light spring to an anaeroid bellows. When the preset pressure was reached, the bellows released the end of the band, which then kicked the chock pin away and unwound to allow the jaws to separate and release their load. The strength, elasticity, and frictional properties of the band material all had to be taken into account for this design to operate properly. However, the spring steel band material originally used proved to be too susceptible to corrosion and had to be replaced with a more corrosion resistant material which was more ductile than the steel band previously used. The original design would no longer operate with the new material, which made it necessary to change the method of holding the free end of the encircling band.

SUMMARY

Briefly, the present invention comprises a small hooked lever, the release lever, which passes through a hole in a second lever, the snubber lever, and engages a hole in the encircling band; both levers are aligned with the encircling band, and are under the last layer of the band. The hole in the snubber lever forms the fulcrum for the release lever; one end of the snubber lever has projections on it which form a fulcrum for the snubber lever itself. In the secure position, the snubber lever is held down by the same small extension spring previously used to hold the band. In this position, the release lever cannot rotate. When the extension spring is released, the snubber lever can rotate around its fulcrum in the notch previously used for the chock pin. The snubber lever is caused to rotate by the pull of the encircling band; as it raises, the release lever rotates and is partially pulled through its fulcrum hole. This results in an almost 180° rotation combined with some translation, and the band slips off the release lever very easily.

OBJECTS OF THE INVENTION

Accordingly, it is an object of the present invention to provide an improved quick-release device for an encircling band.

It is a further object to provide a quick-release device which comprises a pair of levers which interlock with the encircling band.

It is a further object to provide a quick-release device comprising a pair of levers which interlock with each other as well as with the encircling band.

Other objects and advantages of the present invention will be obvious from the following specification and accompanying drawings.

DESCRIPTION OF THE PREFERRED EMBODIMENT

Figure 1:
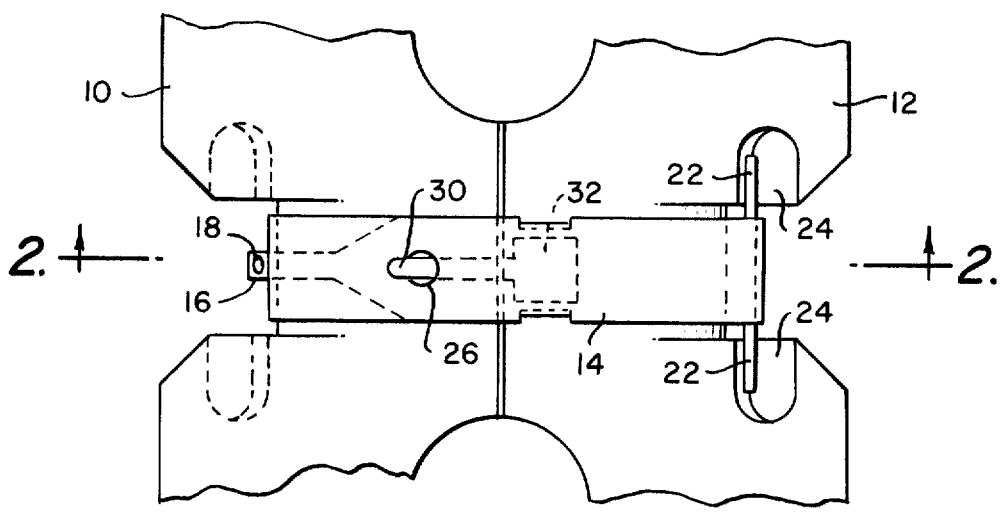
FIG. 1 is a top view of the quick-release device of the present invention.
Figure 2:
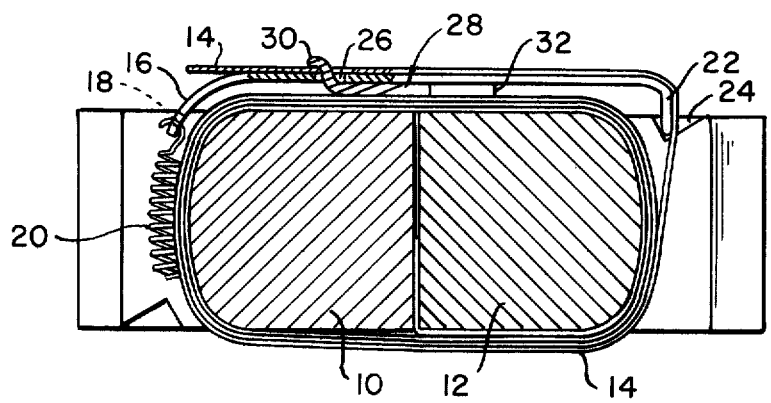
FIG. 2 is taken along line 2—2 of FIG. 1.

FIGS. 1 and 2 show the quick-release device of the present invention in top and section view, respectively. As can be seen, encircling band 14 is wound around jaw blocks 10 and 12 several times and is placed on top of the two levers which comprise the present invention.

Snubber lever 16 is the uppermost of the two levers. It is a flat strip of metal having a slight bend at each end to conform to the shape of the jaw blocks. One end has a hole 18 in it; this hole is the attachment point for the means which connects the snubber lever to the pressure-sensitive device. In the figures, the connection means is spring 20, and the pressure-sensitive device is an anaeroid bellows (not shown). The other end of snubber lever 16 has lateral projections 22 on it which are carried in groove 24 of jaw block 12; these projections form the fulcrum for snubber lever 16, as will be explained later. At a point near its middle, snubber lever 16 has a second hole, hole 26; release lever 28 projects through this hole.

Release lever 28 lies under snubber lever 16; it consists of a slender portion 30, which can slide within hole 26 in snubber lever 16, and a wider portion 32. The end of slender portion 30 has an s-shaped curve in it as can be seen; this holds the snubber lever, release lever, and encircling band in their proper relationship as shown. Obviously, encircling band 14 must also have a hole of the same diameter as hole 26 in it.

Operation of the device is as follows: One end of encircling band 14 is clamped between jaw blocks 10 and 12 and the band is wrapped around the blocks. The end of release lever 28 is inserted in hole 26 of snubber lever 16 and the two levers are placed on top of band 14 as shown. The last wrap of band 14 is then placed on the two levers, and the end of lever 28 is also inserted in the hole in band 14. Spring 20 is then attached to snubber lever 16, and the encircling band is fixed in place.

Figure 3:
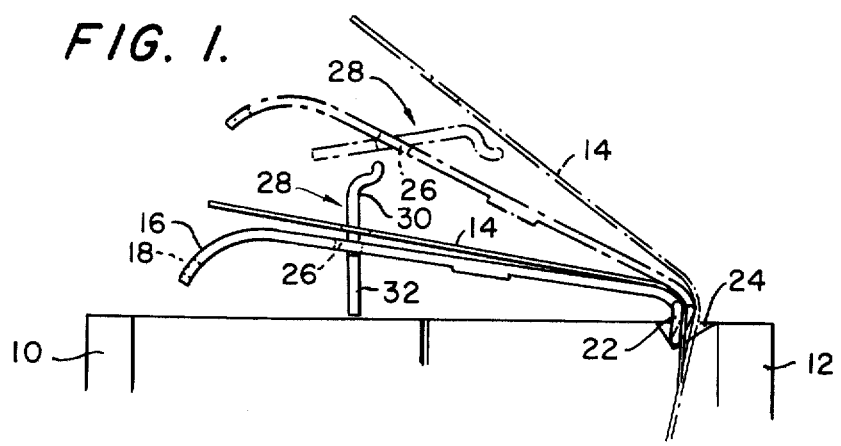
FIG. 3 shows the levers rotating.

The bellows or other pressure-sensitive device (not shown) is the type that releases suddenly when a predetermined pressure is reached. When this occurs, spring 20 is released and the assembly of snubber lever 16, release lever 28, and spring 20 is pulled clockwise by the tension in band 14, as shown in FIG. 3. However, the lateral projections 22 on snubber lever 16 prevent it from translating and cause it to pivot about them as a fulcrum. As snubber lever 16 begins to rotate, release lever 28 begins to rotate clockwise also due to the force on it from band 14 and also due to centrifugal force as the whole assembly is rotated.

As the assembly reaches the dashed line position of FIG. 3, the band is released because the release lever has pivoted through an arc of almost 180°, and the band is able to freely slip off the s-shaped end. In the event that the band gets momentarily caught, the slender part of the release lever can slide within hole 26 to the position shown; this will allow the release lever to move some with respect to snubber lever 16 and the band will disengage itself. In either event, disengagement of the band from the jaw blocks is almost instantaneous after the pressure-sensitive device has released the end of the spring or other attachment means.

A very small force in spring 20 is able to resist a very large force in the encircling band because the force in the band is not transmitted to the snubber lever as a tensile force. Projections 22 on the snubber lever lodge in groove 24 and resist the tension in the encircling band. Due to the fact that projections 22 are displaced somewhat from the line of action of the tensile force, a small torque is generated in snubber lever 16. This small torque is easily resisted by a small tensile force on the other end of snubber lever 16, this small resisting force being provided by spring 20. When the anaeroid bellows (or other pressure-sensitive device, not shown) releases spring 20, the small torque is sufficient to cause the snubber lever-release lever-spring assembly to rotate to the dashed line position of FIG. 3 and release encircling band 14. It has been found that a tensile force of 2 ounces in the spring is able to overcome a tensile force of 10 pounds in the encircling band and provide quick, reliable releases.

Obviously, many modifications and variations of the present invention are possible in the light of the above teachings. It is therefore to be understood that within the scope of the appended claims, the invention may be practiced otherwise than as specifically described.

What is claimed is:

1. A quick-release device for an encircling band comprising:
   a first lever underlying for a substantial portion of its length said encircling band;
   a second lever underlying said first lever and mechanically interlocked with said first lever and said encircling band; and restraint means for one end of said first lever.

2. A quick-release device as in claim 1 wherein one end of said second lever projects through a hole in said first lever and a hole in said encircling band.

3. A quick-release device as in claim 2 wherein said first lever pivots about the end which underlies said encircling band.

4. A quick-release device as in claim 3 wherein said second lever pivots about that end which projects through said first lever and said encircling band.

5. A quick-release device comprising:
   an encircling band;
   a plurality of interlocked pivoting release members connected to said encircling band, said interlocked pivoting release members comprising a pair of levers in superposed relationship situated partially underneath the outer layer of said encircling band and aligned with said encircling band wherein a portion of the lower of said levers projects through a hole in one end of the upper of said levers and a hole in said encircling band; and
   separate restraint means for one end of one of said release members.

6. A quick-release device as in claim 5 wherein said lower lever pivots about that portion which projects through said holes.

7. A quick-release device as in claim 6 wherein one end of said upper lever is connected to said restraint means.

8. A quick-release device as in claim 7 wherein said upper lever pivots about the end which lies beneath said encircling band.

* * * * *